United States Patent [19]
Bullivant et al.

[11] 4,194,649
[45] Mar. 25, 1980

[54] WEIGH FEEDER

[75] Inventors: Kenneth W. Bullivant; Ron Van Ostenbridge, both of Glassboro, N.J.

[73] Assignee: K-Tron International, Inc., Scottsdale, Ariz.

[21] Appl. No.: 803,905

[22] Filed: Jun. 6, 1977

[51] Int. Cl.² .................... G01G 13/14; G01G 23/14
[52] U.S. Cl. .................................. 222/55; 222/63; 198/504; 177/165; 73/DIG. 1
[58] Field of Search ............... 222/52, 55, 63, 77; 198/504; 177/16, 165, 20 FP; 73/DIG. 1

[56] References Cited

U.S. PATENT DOCUMENTS

| | | | |
|---|---|---|---|
| 3,390,731 | 7/1968 | Schierbeek | 177/16 |
| 3,621,713 | 11/1971 | Wirth et al. | 73/DIG. 1 |
| 3,724,720 | 4/1973 | Bullivant | 222/55 X |
| 3,888,321 | 6/1975 | Wiiki et al. | 177/165 |
| 4,071,102 | 1/1978 | Van Ostenbridge et al. | 222/55 X |

Primary Examiner—Joseph J. Rolla
Attorney, Agent, or Firm—Seidel, Gonda, Goldhammer & Panitch

[57] ABSTRACT

A digital weigh feeder includes a conveyor belt for transporting material thereon. The conveyor belt has an average tare weight. A digital weight transmitter provides at least first and second outputs having first and second frequencies respectively. The ratio of the first and second frequencies is indicative of the weight of material on the belt. A weight processor digitally computes a scaled ratio of the first and second frequencies. An auto tare circuit digitally computes the average tare weight of the conveyor belt. The computed average tare weight is substracted from the computed scaled ratio of the first and second frequencies to obtain a reading of the actual weight of material on the belt.

9 Claims, 6 Drawing Figures

WEIGH FEEDER

BACKGROUND OF THE INVENTION

The present invention is directed to a weigh feeder. In particular, the invention is directed to a weigh feeder which comprises a digital weight transmitter operatively associated with a conveyor belt for providing plural frequency signals which are indicative of the weight of material on the belt.

Digital weigh feeders are well known. For example, see U.S. Pat. No. 3,724,720 entitled "Digital Mass Flow Control System" assigned to the assignee herein. These weigh feeders are termed "true rate" systems since they control the true or instantaneous rate of the mass flow of material. In such systems, belt speed is automatically adjusted as a function of the weight of material sensed on the belt to achieve a constant feed or mass flow rate. Specifically, belt speed and belt loading are sensed and multiplied together to obtain an actual mass flow feedback signal. This feedback signal is compared to a desired flow rate or set point signal. Any difference between the two signals causes a change in belt speed to achieve a steady flow of material.

The heart of any weigh feeder is the weight sensing component. The performance demands on such a component may be awesome. The ideal weight sensing component must be highly precise, exactly repeatable, completely linear and capable of operating over a broad range of loading conditions while remaining rugged and stable through long use with little or no calibration. The ideal weight sensing component would require no stabilization time, would not deflect under loading, and would be immune to vibration and temperature extremes. Heretofore, the weight sensing components used in weigh feeders fell far short of the ideal in respect to many of the above requirements. As such, the weigh sensing components considerably limited the performance of weigh feeder systems.

A vibrating string digital weight transmitter closely approximates the above criteria for an ideal weight sensing component. Such a digital weight transmitter is described in U.S. Pat. Nos. 3,411,347, 3,423,999, 3,621,713, 3,763,971, 3,724,573 and 3,805,605. The transmitter offers unexcelled accuracy and stability. The transmitter senses a load digitally so that loading information is not subject to inaccuracies due to drift which inaccuracies are common in analog weight sensors. The vibrating string transmitter is extremely accurate and may provide repeatability of ±0.003%, linearity of ±0.03% and long term stability of ±0.03% over considerable periods of time. The vibrating string transmitter closely approximates a defectionless load sensing system and is virtually immune to temperature and vibration extremes which typify the weigh feeder environment.

The vibrating string digital weight transmitter provides plural output signals at different frequencies. The ratio of the frequencies provides an indication of the weight being sensed by the transmitter. Weigh feeder systems known in the art are not compatible with such weight transmitters. Accordingly, such weigh feeders cannot secure the benefits in accuracy, stability and reliability of a vibrating string transmitter.

An advantage of the present invention is that it is totally compatible with a vibrating string digital weight transmitter.

Another disadvantage of the invention is that it is much more accurate, stable and reliable than weigh feeders known in the art.

A further advantage of the invention is that it automatically computes the average tare weight of a conveyor belt and provides an accurate indication of the actual weight of material on the belt.

Other advantages appear hereinafter.

SUMMARY OF THE INVENTION

In a digital weigh feeder including a conveyor belt for transporting material thereon, a digital weight transmitter operatively associated with the belt for providing at least first and second outputs having first and second frequencies respectively. The ratio of the first and second frequencies is indicative of the weight of material on the belt. A first means digitally computes a scaled ratio of the first and second frequencies. A second means operatively associated with the first means digitally computes the average tare weight of the belt. A third means digitally subtracts the computed average tare weight from the computed scale ratio of the first and second frequencies to obtain an indication of the actual weight of material on the belt.

For the purpose of illustrating the invention, there is shown in the drawings a form which is presently preferred; it being understood, however, that this invention is not limited to the precise arrangements and instumentalities shown.

DETAILED DESCRIPTION OF THE INVENTION

Figure 1:
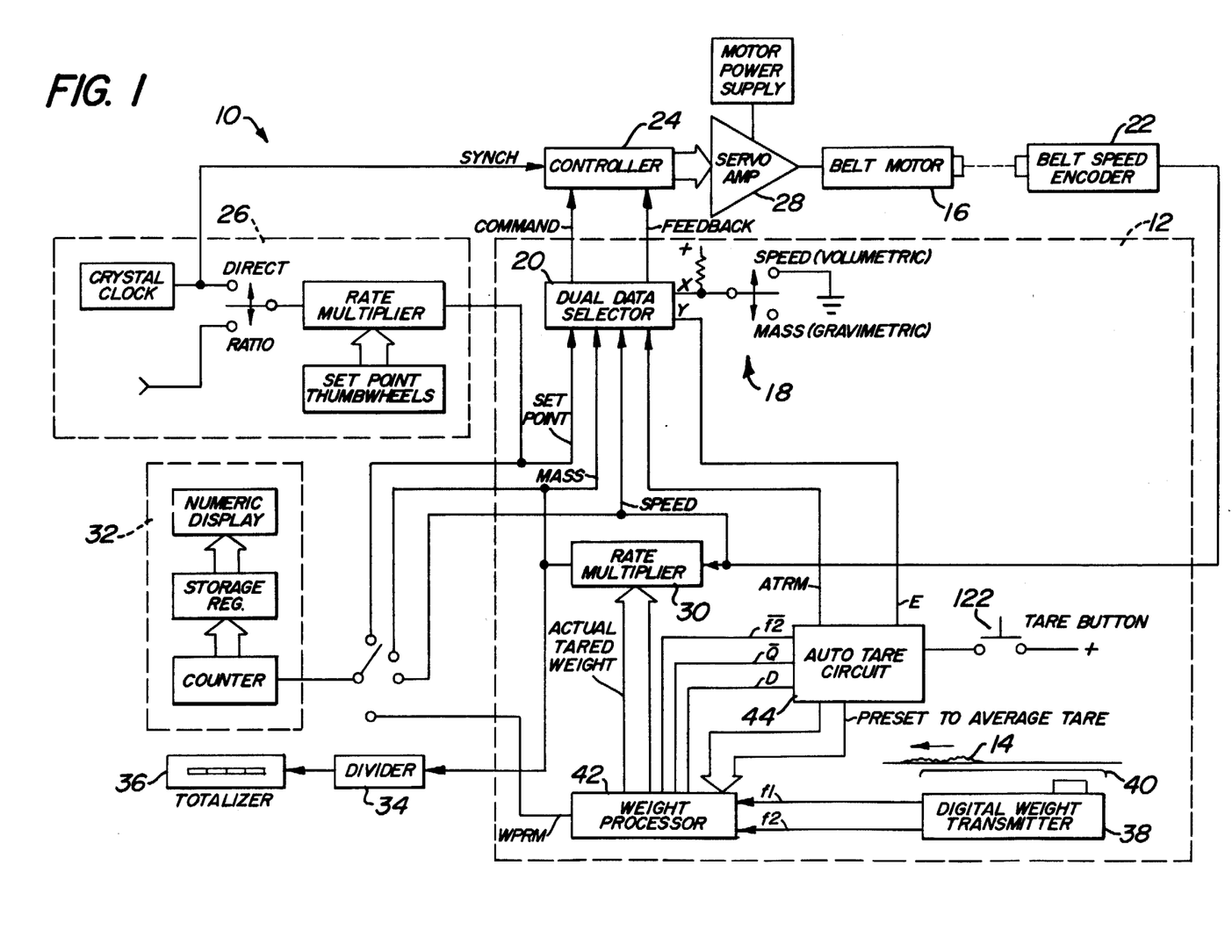
FIG. 1 is a block diagram of a weigh feeder system of the present invention.

Referring to the drawings in detail, wherein like numerals indicate like elements, there is shown in FIG. 1 a weigh feeder 10 in accordance with the principles of the present invention. The present invention is directed in particular to the weight/tare section 12 of weigh feeder 10. The operation of the remaining components of the weigh feeder are well known and are described in exacting detail in U.S. Pat. No. 3,724,720 making further detailed description herein unnecessary.

The weigh feeder is capable of operating in a speed or volumetric mode and in a mass or gravimetric mode. In the speed mode, it is presumed that material is being deposited at a constant rate on the belt 14. Accordingly, the speed of a belt motor 16 is maintained constant to preserve a steady volumetric flow of material. In the speed or volumetric mode, a mode switch 18 is thrown to the speed position. This causes a dual data selector such as a RCA 4539 dual 1 of 4 selector to pass the output of a belt speed encoder 22 to the feedback input of a controller 24. In addition, the data selector 20 passes the set point output of a set point circuit 26 to the command input of controller 24. The set point output of set point circuit 26 represents the desired speed of operation of the belt 14 in the speed of volumetric mode. The controller 24 operates a servo amplifier 28 to control the belt speed via belt motor 16. Controller 24 typically comprises an up/down counter and input synchronizing circuitry for computing the difference between the command and feedback signals, as disclosed in U.S. Pat. No. 3,724,720.

In the mass or gravimetric mode, the mode switch 18 is thrown to the mass position. This causes the dual data selector 20 to transmit the output of a rate multiplier 30 to the feedback input of controller 24. In addition, the data selector 20 transmits the set point output of set point circuit 26 to the command input of controller 24. The set point output of set point circuit 26 represents the desired mass flow rate in the mass or gravimetric mode. The controller 24 operates the servo amplifier 28 as a function of the difference between the command and feedback signals at the output of the dual data selector 20. In particular, the controller 24 operates the servo amplifier 28 to vary the speed of belt motor 16 to maintain a steady mass flow rate of material.

In the weigh feeder described in U.S. Pat. No. 3,724,720, the rate multiplier 30 multiplies the output of the belt speed encoder 22 with a mass or weight signal provided by a load cell-digital volt meter pair to provide an output signal which is indicative of the rate of mass flow of material on the belt 14. The set point, mass flow and belt speed can be selectively displayed by means of a display circuit 32 as described in the patent. Alternatively, total mass can be displayed by means of a divider 34 and totalizer 36. The reader is referred to U.S. Pat. No. 3,724,720 for further details of the structure and operation of the components described above. The remainder of the description of the weigh feeder herein is directed to the weigh/tare section 12 of the present invention.

Weigh/tare section 12 includes a digital vibrating string weight transmitter 38 preferably associated with a weigh deck 40 disposed beneath the belt 14. The weigh deck 40 transmits the belt load to the transmitter 38. The weigh deck 40 per se does not comprise the present invention.

The digital weight transmitter 38 generates two separate output signals having frequencies f1 and f2 respectively. Frequencies f1 and f2 vary as a function of the load applied to belt 14. The ratio of the frequencies f1 and f2 provides an indication of the weight of material on the belt 14. That indication, however, will include the tare weight of the belt itself. Thus, to obtain a measurement of the actual weight of material on the belt, it is necessary to compensate the weight measurement by the tare weight of the belt. In mathematical terms, the actual weight of material on the belt is given by:

$$\text{Actual weight} = K1(f1/f2) - K2 \qquad (1)$$

where K1 is a constant determined by the full scale range of the weight transmitter 38 and K2 is a constant equal to the average tare weight of the belt 14.

The weight K1(f1/f2) is digitally computed by a weight processor 42. See FIG. 1. The average tare weight of the belt 14 is digitally computed by an auto tare circuit 44. The output of the weight processor 42 represents the actual weight of material on the belt compensated by the average tare weight of the belt. This output is transmitted to the rate multiplier 30 for purposes of mass flow and belt speed computations as described above.

The weigh feeder 10 operates in either of two modes: a normal mode and a tare mode. In the normal mode, the weight/tare section 12 transmits the set point output of set point circuit 26 to the command input of controller 24. In addition, in the normal mode, the weight/tare section 12 either transmits the output of belt speed encoder 22 to the feedback input of controller 24 when mode switch 18 is thrown to the speed or volumetric position or the section 12 transmits the output of rate multiplier 30 to the feedback input of controller 24 when switch 18 is thrown to the mass or gravimetric position. In the tare mode, the weight/tare section 12 transmits an ATRM signal to the command input of controller 24. The ATRM signal represents the belt speed necessary for the belt to traverse an integral number of loops to complete the average tare weight calculation as will be described more fully hereinafter. In addition, in the tare mode, the weight/tare section 12 transmits the output of belt speed encoder 22 to the feedback input of controller 24. The operation of the weigh feeder 10 in the normal and tare modes is described in greater detail below.

Operation In The Normal Mode

In the normal mode of operation, the weight processor 42 provides an output indicative of the actual tared weight of material on the belt 14 in response to the f1 and f2 outputs of the digital weight transmitter 38. The weight processor 42 is shown in detail in block diagram form in FIG. 2A. The f1 output of the digital weight transmitter is passed through an opto-isolator 46 and a bandpass filter 48. The bandpass filter 48 is centered at a typical f1 frequency and has a band width of approximately 1.25 Khz. The optoisolator 46 and bandpass filter 48 are well known signal processing components used to separate the input signal from background noise. The BPO output of bandpass filter 48 is fed to a zero cross detector 50. The zero cross detector 50 shapes the BPO signal to provide a well-defined digital pulse train ZCD at the input to a frequency multiplier 52.

Figure 2A:
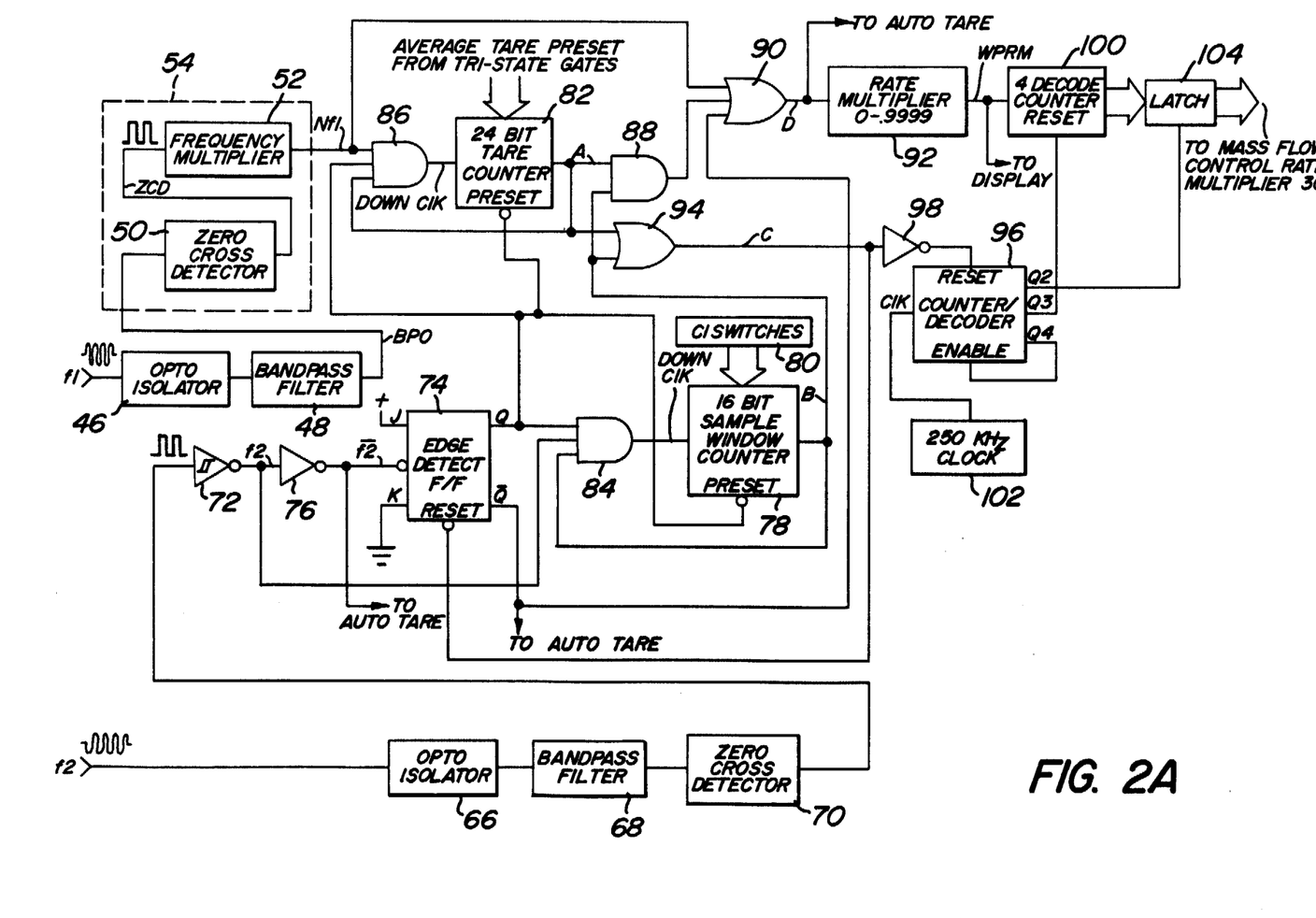
FIGS. 2A and 2B comprise a block diagram of the weight processor.
Figure 2B:
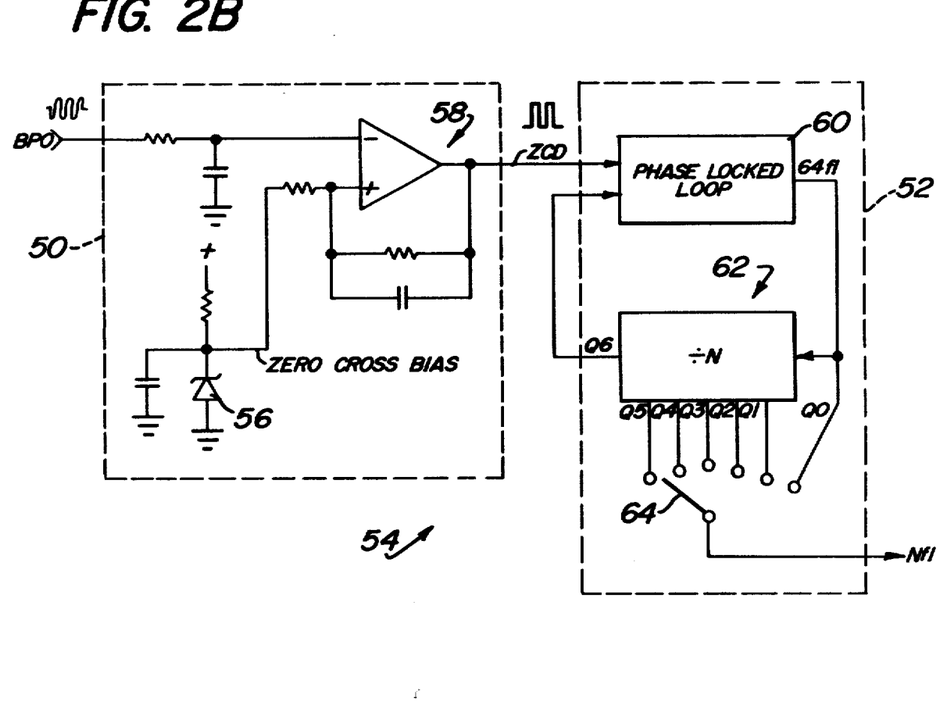

A preferred form for the zero cross detector 50 and frequency multiplier 52 is shown in FIG. 2B. The zero cross bias or threshold is provided by a Zener diode 56. The excursions of the BPO output of bandpass filter 48 through the zero cross bias are detected by amplifier 58. The ZCD output of amplifier 58 is a digital pulse train which drives a phase locked loop 60 in frequency multiplier 52. The frequency of the ZCD signal is f1. The output of the phase locked loop 60 is fed to a selectable divider 62. The divider 62 may be a 7 stage binary counter such as a RCA 4024 type counter. Only the first 6 stages of the counter are used in the preferred embodiment described herein as indicated by the lines Q1–Q6. The output of the sixth stage of the divider is coupled to the input of the phase locked loop 60. The output of the phase locked loop 60 is a pulse train having a frequency 64 times frequency f1. The Q1 output of the first stage of the divider will be a pulse train having a frequency of 32 times f1. The Q2 output of the second divider stage will have a frequency of 16 times f1. The Q3 output of the third divider stage will have a frequency of 8 times f1. The Q4 output of the fourth divider stage will have a frequency of 4 times f1. And the Q5 output of the fifth divider stage will have a frequency of 2 times f1.

The output of the frequency multiplier 52, designated Nf1, will be a pulse train having a frequency which is a multiple N of the frequency f1 depending upon the selected position of switch 64. In the preferred embodiment herein, switch 64 is actually a jumper which may be selectively connected between the frequency multiplier output Nf1 and the Q0–Q5 lines. The particular value of N to be selected will be a function of the full scale range of the digital weight transmitter 38 as will be described in detail hereinafter.

The f2 signal output of the digital weight transmitter 38 is fed to an opto-isolator 66, bandpass filter 68 and zero cross detector 70. See FIG. 2A. Opto-isolators 46 and 66 are identical. Bandpass filters 48 and 68 are of approximately the same band width but of different center frequencies. Whereas bandpass filter 48 has a center frequency equal to frequency f1, bandpass filter 68 has a center frequency equal to frequency f2. Zero cross detectors 50 and 70 are identical. The output of zero cross detector 70 is shaped by a Schmitt trigger inverter 72. The output of the Schmitt trigger inverter is a pulse train having a frequency equal to frequency f2.

The output of the Schmitt trigger inverter is transmitted to the clock input of an edge detector flip-flop 74 via inverter 76. The output of the inverter is designated $\overline{f2}$. The Nf1 and f2 signals are the digital signals which are manipulated by the remaining portion of the weight processor 42 to compute the actual weight of material on the belt 14 according to equation (1) above.

The equation for the computation of actual weight of material on the belt as given above can be rewritten in the following form:

$$\text{Actual weight} = (N \times c1)(f1/f2) - K2 \quad (2)$$

where the constant K1 has been replaced by the term $N \times c1$ and N is the multiplication factor of frequency multiplier 52. This equation can be rearranged further as follows:

$$\text{Actual weight} = (N \times f1)(c1 \times P2) - K2 \quad (3)$$

where $P2 = 1/f2$.

The quantity $c1 \times P2$ defines a sample time window for computing the weight of material on the belt. It should be noted that the sample window itself will vary since P2 is a function of frequency f2 which varies with the load on the belt.

The constants N and c1 depend on the full scale range of the digital weight transmitter 38. The constants N and c1 are chosen to take on the values given in Table 1 below to ensure that a maximum of 1000 pulses appear at the WPRM output of the weight processor 42 during a single sample window when full scale weight is on the belt.

Table 1

| Digital Weight Transmitter Full Scale Range (Kg)* | N | c1 |
|---|---|---|
| 0.200 | 64 | 4000 |
| 0.400 | 32 | 4000 |
| 0.600 | 32 | 2667 |
| 0.800 | 16 | 4000 |
| 1.000 | 16 | 3200 |
| 2.000 | 8 | 3200 |
| 4.000 | 4 | 3200 |
| 6.000 | 4 | 2133 |

*For 6kg maximum full scale range weight transmitter c1 = (5.12 × 10$^4$)/N · full scale range; maximum WPRM = 1000 pulses at full scale range load For loads less than the full scale load, no more than 1000 WPRM pulses will be produced by the weight processor per sample window. This is guaranteed by the choice of N and c1 as indicated by Table 1 above.

The length of a sample window is equal to $c1 \times P2$. The factor c1 therefore determines the length of a sample window. The length of a sample window is determined by sample window counter 78 in weight processor 42. See FIG. 2A. The sample window counter 78 is a 16 bit presettable down counter whose preset inputs are connected to plural c1 switches 80. Switches 80 comprise a bank of parallel connected rocker switches, each rocker switch being coupled to a preset input of counter 78. The c1 switches 80 are selectively placed in open and closed positions to preset counter 78. These switches are programmable in the factory or the field prior to operation of the weigh feeder. During operation of the weigh feeder, the switches would not be accessible to the operator.

The weight processor 42 also includes a tare counter 82. Tare counter 82 is a 24 bit presettable down counter which is preset to the average tare weight computed by auto tare circuit 44 as will be described in detail hereinafter. The tare counter 82 accounts for the constant K2 in equation (3) above.

In operation, the first f2 pulse at the output of Schmitt trigger inverter 72 is transmitted by inverter 76 to toggle edge detector flip-flop 74. When toggled, the Q output of the flip-flop enables AND gate 84 to pass the f2 output of Schmitt trigger 72 to the clock input of the sample window counter 78. At the same time, the Q output of edge detector flip-flop 74 enables AND gate 86 to pass the Nf1 pulses at the output of frequency multiplier 52 to the clock input of tare counter 82. Tare counter 82 counts down the Nf1 pulses and sample window counter 78 counts down the f2 pulses.

For typical belt loads, the frequency f1 is between approximately 14.5 Khz and 16 Khz and the ratio f1/f2 fluctuates between approximately 1.017 and 1.250. Accordingly, the frequency of the Nf1 pulses is much greater than the frequency f2. As a result, the tare counter 82 will count down to zero before sample window counter 78. When the tare counter 82 reaches the zero count, its A output disables AND gate 86 from passing any further Nf1 pulses to the counter. At the same time, the A output of the counter disables an AND gate 88 which in turn enables an OR gate 90 to pass the Nf1 pulses at the output of frequency multiplier 52 to a rate multiplier 92.

Ideally, the rate multiplier 92 is set at 0.5000. At this setting, under ideal conditions, the WPRM output of rate multiplier 92 will consist of 1000 pulses for each sample window set by counter 78 when full scale load is on the belt 14. If the load on the belt is less than full scale, the number of pulses at the WPRM output of rate multiplier 92 per sample window will be less than 1000. In any case, the number of pulses appearing at the WPRM output of rate multiplier 92 per sample window will indicate the actual weight of material on the belt 14. It should be noted that the maximum limit of 1000 pulses is arbitrarily chosen to represent full scale loading. Other limits can also be chosen with slight modification to the logic circuitry described herein as will be obvious to the person of ordinary skill in the art.

In practice, the setting of rate multiplier 92 required to obtain 1000 pulses at the WPRM output under full scale load conditions may vary somewhat from 0.5000. Thus, in practice, inaccuracies in the weight measurement introduced by the mechanical components of the weigh feeder, such as inaccuracies in the weigh deck dimensions, will cause more or less than 1000 pulses to appear at the WPRM output of the rate multiplier during a sample window when the rate multiplier is set at 0.5000. These inaccuracies are easily compensated for by manipulating the setting of the rate multiplier to obtain the required number of pulses at the WPRM output under full scale load conditions.

Figure 4A:
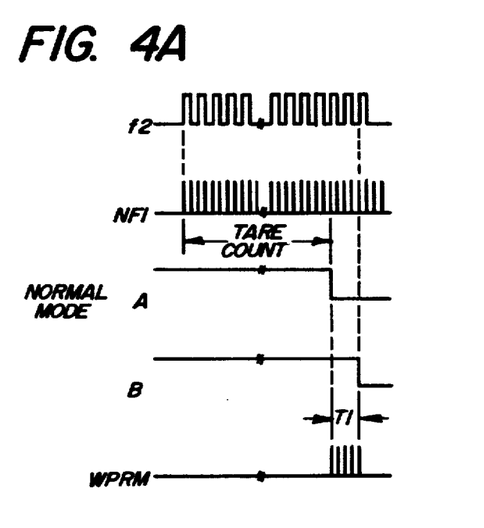
FIGS. 4A and 4B are waveforms of certain of the signals generated by the weigh feeder.
Figure 4B:
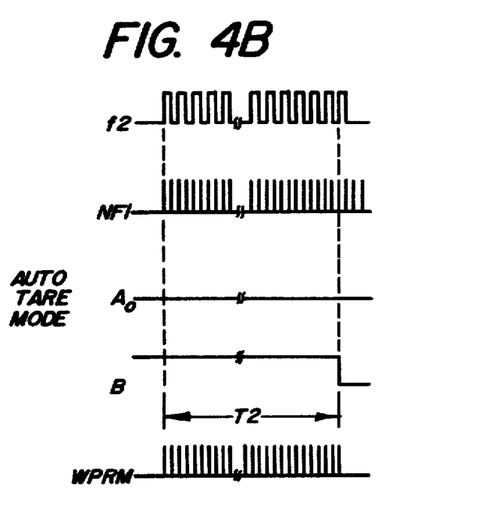

As indicated above, the rate multiplier 92 passes a certain number of Nf1 pulses to its WPRM output after the tare counter 82 reaches a zero count and before the sample window ends. This is indicated by the time interval T1 in FIG. 4A. The end of the sample window is determined by counter 78 in conjunction with an OR gate 94. See FIG. 2A. The sample window ends when the counter 78 reaches the zero count. At this time, the B output of counter 78 disables AND gate 84 from passing any further f2 pulses to the counter. At the same time, the B output of the counter causes a counter/decoder 96 to be reset via OR gate 94 and inverter 98. The B output of the counter also causes edge detector flip-flop 74 to be reset via OR gate 94.

When reset, the Q output of the edge detector flip-flop presets the tare counter 82 and sample window counter 78 in preparation for the computation of weight for the next sample window. In addition, when the edge detector flip-flop 74 is reset, the $\bar{Q}$ output of the flip-flop disables OR gate 90 from passing any further Nf1 pulses to the rate multiplier 92. This marks the end of the T1 interval shown in FIG. 4A.

During the T1 interval, the rate multiplier 92 transmits the WPRM pulses to a 4 decade counter 100. The counter 100 counts the WPRM pulses to provide a digital indication of the weight of material on the belt sensed during the sample window. The sequence of operation of the counter 100 is controlled by the counter/decoder 96. The counter/decoder 96 is preferably a RCA 4022 type counter/divider with 8 decoded outputs Q0–Q7. Only the Q2, Q3 and Q4 outputs of the counter/decoder are used.

The counter/decoder is clocked by a 250 Khz clock oscillator 102. After the counter/decoder 96 is reset at the end of the T1 interval, it begins to count the pulses generated by clock oscillator 102. When the counter/decoder counts to two, its Q2 output enables a latch circuit 104 to transmit the count of WPRM pulses maintained in counter 100 to the mass flow control rate multiplier 30. The rate multiplier will then perform a conventional computation of belt speed times weight to derive the mass flow signal used to control mass flow in the mass or gravimetric mode as described in U.S. Pat. No. 3,724,720. When the counter/decoder 96 reaches a count of three, the Q3 output of the counter/decoder resets the counter 100 in preparation for the next computation of weight for the next sample window. When the counter/decoder counts to four, the Q4 output of the counter/decoder disables the counter/decoder from counting any further. Thereafter, the counter/decoder will be reset at the end of the next sample window by the B output of the sample window counter 78 as previously described.

Operation in the Tare Mode

In the foregoing description of operation in the normal mode, it was presumed that the tare counter 82 had been preset to the average tare weight of the belt 14. In the tare mode, the average tare weight of the belt is computed and supplied to the preset inputs of the tare counter 82. The auto tare circuit 44 digitally computes the average tare weight of the belt in the tare mode. The auto tare circuit 44 is shown in detailed block diagram form in FIG. 3.

In the tare mode, the tare weight of the belt 14 is averaged in respect to the number of sample windows per each complete loop of travel of the belt. The number of sample windows per belt loop is predetermined by manipulation of divisor switches 106 and 108. See FIG. 3. Divisor switches 106 and 108 control the operation of selectable dividers 110 and 112 respectively. Selectable dividers 110 and 112 comprise identical 12 bits counters 114 and 116. The sixth, eighth and tenth bit outputs of counters 114 and 116 are selectively tapped by switches 106 and 108 to average the belt tare weight over 64, 256 or 1024 sample windows.

Figure 3:
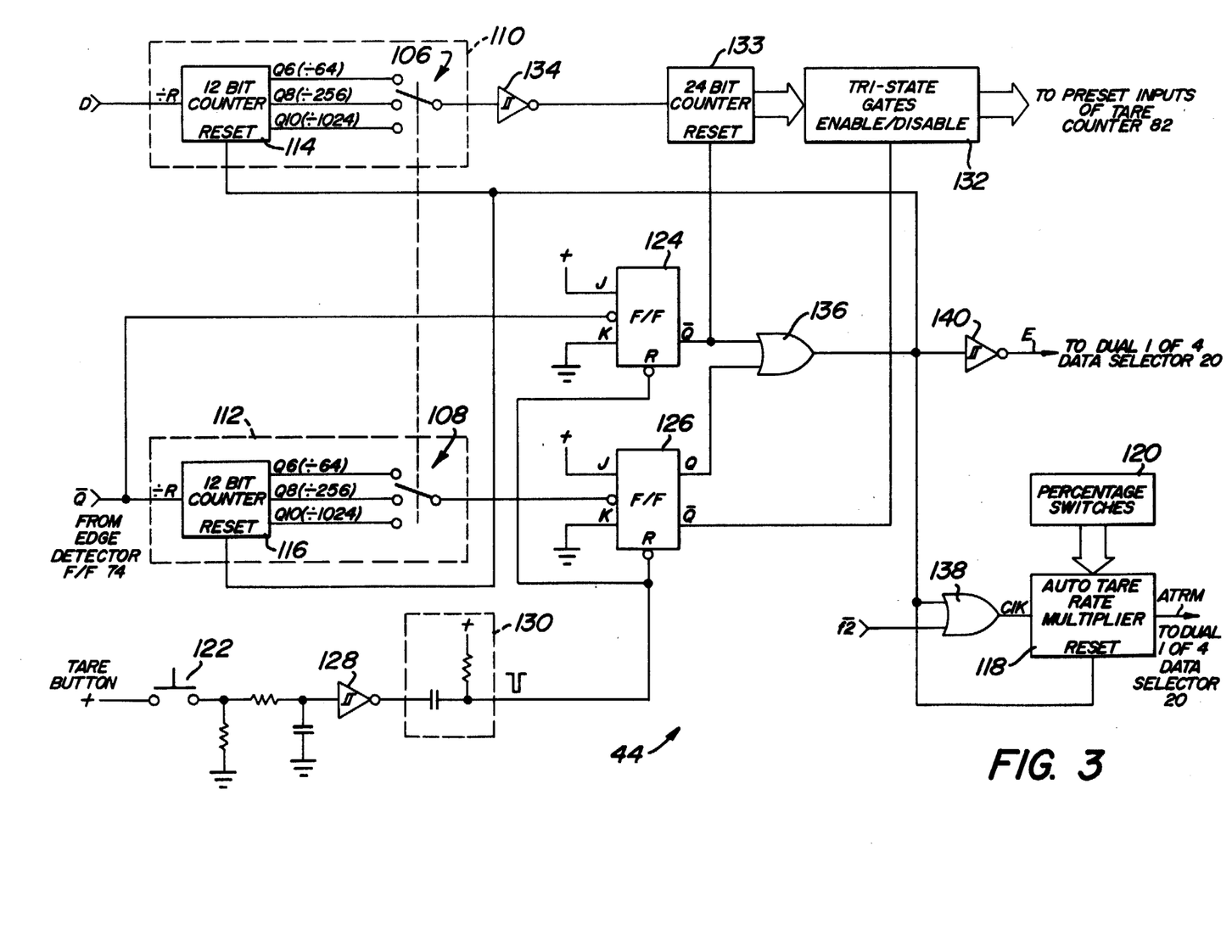
FIG. 3 is a block diagram of the auto tare circuit.

During a tare calculation, the belt speed must be controlled to provide an integral number of loops of travel of the belt for the selected number of sample windows. This is accomplished by driving the command input of the controller 24 with the output, designated ATRM, of an auto tare rate multiplier 118. The feedback input to the controller, in the tare mode, is the output of belt speed encoder 22. Selection of the command and feedback inputs to the controller 24 in the tare mode is governed by dual data selector 20 as previously described. The operation of the dual data selector is summarized in Table 2 below.

Table 2

| X | Y | Command Line | Feedback Line | Mode |
|---|---|---|---|---|
| 0 | 0 | Set point | Speed | Normal/Volumetric |
| 1 | 0 | Set point | Mass | Normal/Gravimetric |
| 0 | 1 | ATRM | Speed | Tare |
| 1 | 1 | ATRM | Speed | Tare |

From Table 2, it should be evident that the speed of the belt is always governed by the ATRM output of rate multiplier 118 in the tare mode.

The number of pulses appearing at the ATRM output of rate multiplier 118 is determined by the number of f2 pulses generated at the output of inverter 76, see FIG. 2A, and the setting of percentage switches 120. In the preferred embodiment herein, rate multiplier 118 is a three decade multiplier which passes a fixed percentage of the f2 pulses as determined by the setting of percentage switches 120. Percentage switches 120 comprise three decades of BCD switches for setting the decades of rate multiplier 118.

The setting S of the percentage switches is determined by the following equation:

$$S = (B \times E)/(R \times c1 \times F) \qquad (4)$$

where B is the belt length in feet, E is the number of belt speed encoder output pulses at full scale belt seed, R is the number of sample windows selected by operation of switches 106 and 108, and F is the full scale belt speed in feet per minute.

In operation, the number of sample windows R is selected by setting switches 106 and 108 to the appropriate bit outputs of counters 114 and 116. This fixes the time interval during which the average tare belt weight is to be computed. To initiate operation in the tare mode, a tare switch or button 122 is depressed to generate a reset pulse at the reset inputs of flip-flops 124 and 126 via a Schmitt trigger inverter 128 and differentiator circuit 130. When reset, the $\bar{Q}$ output of flip-flop 126 disables a bank of tri-state gates 132. The tri-state gates 132 comprise 24 conventional tri-state gates, each of which connects a bit output from 24 bit counter 133 to the preset input of a corresponding bit in 24 bit tare counter 82. The state of each of the gates is controlled by the enable/disable input which is connected to the $\bar{Q}$ output of flip-flop 126. The output of each of the gates is connected to a pull-down resistor coupled to ground. When the gates are disabled, their outputs are open and the preset inputs to the 24 bit tare counter 82 sill therefore be pulled to a binary low state indicating a zero preset count. Accordingly, at the beginning of operation in the tare mode, the tare counter 82 will be preset to zero.

When the tare counter 82 is preset to zero, the A output of the counter will enable OR gate 90 to pass the Nf1 output pulses from frequency multiplier 52 to the 12 bit counter 114. See FIGS. 2A and 3. The counter 114 counts the Nf1 pulses and divides that count by the divisor R. The divided count output of counter 114 represents the average tare belt weight. The divided count is passed via Schmitt trigger inverter 134 to the 24 bit counter 133.

At the beginning of the first sample window, the $\bar{Q}$ output of edge detector flip-flop 74 toggles flip-flop 124. When toggled, the $\bar{Q}$ output of flip-flop 124 releases the reset on 24 bit counter 133. Accordingly, the counter 133 is free to count the pulses at the output of Schmitt trigger inverter 134 throughout the tare mode.

At the end of each sample window, the $\bar{Q}$ output of edge detector flip-flop 74 clocks 12 bit counter 116. When the preselected number of sample windows has been counted by counter 116, the counter toggles flip-flop 126. Accordingly, the Q output of flip-flop 126 enables the tri-state gates 132. When enabled, the tri-states gates pass the average tare count maintained in counter 133 to the preset inputs of tare counter 82. The tare counter 82 will therefore be preset to the average belt tare count during the normal mode of operation.

To ensure that the belt 14 traverses an integral number of loops during the tare mode, the rate multiplier 118 commands the controller 24 as previously described. When the tare button 122 is depressed, flip-flop 124 is reset so that the Q output of the flip-flop resets the rate multiplier via OR gate 136 while disabling OR gate 138 from passing any f2 pulses to the rate multiplier. Thereafter, at the beginning of the first sample window, the Q output of edge detector flip-flops 74 toggles flip-flop 124 as previously described to cause the Q output of flip-flop 124 to enable OR gate 138 via OR gate 136. As a result, OR gate 138 passes the f2 pulses to the clock input of rate multiplier 118.

The rate multiplier 118 passes a fixed percentage of the f2 pulses to its ATRM output as determined by the setting of percentage switches 122 as previously explained. The controller 24, then, controls the belt speed to ensure that an integral number of revolutions of the belt is obtained during the tare mode. At the end of the tare mode, counter 116 toggles flip-flop 126 as previously described to cause the Q output of flip-flop 126 to reset the rate multiplier 118 while disabling OR gate 138 from passing any further f2 pulses to the rate multiplier.

During the tare mode, OR gate 136 controls the operation of dual data selector 20 via a Schmitt trigger inverter 140. The dual data selector 20 operates in response to the output of the Schmitt trigger inverter as indicated in Table 2 above.

An advantage of the invention is that it automatically computes the tare weight of a conveyor belt and provides an accurate indication of the actual weight of material on the belt with extreme accuracy and reliability. The invention is totally compatible with a vibrating string digital weight transmitter. Further, the invention comprises commercially available modular digital circuits to facilitate construction and repair. Preferably, the modular circuits are CMOS circuits so that power consumption is relatively low.

The present invention may be embodied in other specific forms without departing from the spirit or essential attributes thereof and, accordingly, reference should be made to the appended claims, rather than to the foregoing specification as indicating the scope of the invention.

We claim:

1. In a digital weigh feeder including a conveyor belt for transporting material thereon, the conveyor belt having an average tare weight associated therewith, the combination comprising:
 a digital weight transmitter operatively associated with a conveyor belt for providing at least first and second outputs having first and second frequencies respectively, the ratio of said first and second frequencies being indicative of the weight of the belt and any material transported thereon,
 means for providing an average tare weight signal representative of the average tare weight of said conveyor belt, and
 means for digitally computing the ratio of said first and second frequencies including first means operatively associated with said first digital weight transmitter output for automatically providing a first digital signal representative of said first frequency over a first time interval based on said average tare weight signal and second means operatively associated with said second digital weight transmitter output for automatically providing a second digital signal representative of said first frequency over a second time interval based on said second frequency.

2. In a digital weigh feeder, the combination according to claim 1 wherein said means for providing an average tare weight signal includes means operatively associated with said first weight transmitter output for automatically providing an averaged digital count representative of said average tare belt weight over a preselected number of said second time intervals.

3. In a digital weigh feeder, the combination according to claim 1 wherein said first and second means include separate presettable down counters.

4. In a digital weigh feeder, the combination according to claim 1 wherein said means for providing an average tare weight signal comprises means for automatically providing a digital count representative of said first frequency over a time interval equal to the time required for said belt to complete an integral number of loops of travel.

5. In a digital weigh feeder including a conveyor belt for transporting material thereon, the conveyor belt having an average tare weight associated therewith, the combination comprising:
 a digital weight transmitter operatively associated with a conveyor belt for providing at least first and second outputs having first and second frequencies respectively, the ratio of said first and second frequencies being indicative of the weight of the belt and any material transported thereon,
 means for digitally computing the average tare weight of said conveyor belt, and
 means for digitally computing a scaled ratio of said first and second frequencies including first means operatively associated with said first digital weight transmitter output for automatically providing a first digital signal representative of said first frequency over a first time interval based on said average tare weight and second means operatively associated with said second digital weight transmitter output for automatically providing a second digital signal representative of said first frequency over a second time internal based on said second frequency.

6. In a digital weigh feeder, the combination according to claim 5 wherein said means for digitally computing the average tare weight includes means operatively associated with said first digital weight transmitter output for automatically providing an averaged digital count representative of said average tare belt weight over a preselected number of said second time intervals.

7. In a digital weigh feeder, the combination according to claim 5 wherein said first and second means include separate presettable down counters.

8. In a digital weigh feeder including a conveyor belt for transporting material thereon, the conveyor belt having an average tare weight associated therewith, and a controller for controlling the speed of the belt, the combination comprising:

a digital weight transmitter operatively associated with a conveyor belt for providing at least first and second outputs having first and second frequencies respectively, the ratio of said first and second frequencies being indicative of the weight of the belt and any material transported thereon, means for providing an average tare weight signal representative of the average tare weight of said conveyor belt, means for generating a first train of pulses at said first frequency or at an integral multiple thereof, means for generating a second train of pulses at said second frequency, and means for gating a portion of said first train of pulses to said controller based on said average tare weight signal and on said second frequency of said second pulse train.

9. A method of computing the weight of material on a conveyor belt having an average tare weight associated therewith, comprising:

(a) sensing the weight of material on a conveyor belt and generating at least first and second frequency signals having first and second frequencies respectively as a function thereof, (b) digitally computing the average tare weight of said conveyor belt, and (c) digitally computing a scaled ratio of said first and second frequencies including automatically providing a first digital signal representative of said first frequency over a first time interval based on said average tare weight and automatically providing a second digital signal representative of said first frequency over a second time interval based on said second frequency.

* * * * *